US012130182B2

(12) United States Patent
Maeda et al.

(10) Patent No.: US 12,130,182 B2
(45) Date of Patent: Oct. 29, 2024

(54) TRANSMISSION TYPE COLOR GRADATION CHART, TRANSMISSION TYPE COLOR GRADATION CHART DEVICE AND GRAY GRADATION CHART

(71) Applicant: DAI NIPPON PRINTING CO., LTD., Tokyo-to (JP)

(72) Inventors: Akihiro Maeda, Tokyo-to (JP); Yoshihiko Ogino, Tokyo-to (JP); Yoichi Kajimura, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 238 days.

(21) Appl. No.: 17/768,606

(22) PCT Filed: Oct. 12, 2020

(86) PCT No.: PCT/JP2020/038510
§ 371 (c)(1),
(2) Date: Aug. 12, 2022

(87) PCT Pub. No.: WO2021/075406
PCT Pub. Date: Apr. 22, 2021

(65) Prior Publication Data
US 2022/0390283 A1 Dec. 8, 2022

(30) Foreign Application Priority Data
Oct. 15, 2019 (JP) .................. 2019-188461

(51) Int. Cl.
*G01J 3/52* (2006.01)
(52) U.S. Cl.
CPC ............... *G01J 3/526* (2013.01); *G01J 3/524* (2013.01)

(58) Field of Classification Search
CPC ..... G01J 3/52; G06K 15/027; G06K 15/1276; G06K 2215/111; H04N 1/6027; H04N 1/00045
USPC .................. 358/504, 518, 521; 382/167, 162
See application file for complete search history.

(56) References Cited

U.S. PATENT DOCUMENTS

| 2005/0142654 A1 | 6/2005 | Matsumoto et al. |
| 2018/0332189 A1 | 11/2018 | Tatsuda |
| 2019/0137340 A1 | 5/2019 | Ogino et al. |

FOREIGN PATENT DOCUMENTS

| JP | 2000-019018 A | 1/2000 |
| JP | 2003-111108 A | 4/2003 |
| JP | 2013-088226 A | 5/2013 |
| JP | 2017215259 A * | 12/2017 |

(Continued)

OTHER PUBLICATIONS

Dec. 28, 2020 International Search Report issued in International Patent Application No. PCT/JP2020/038510.

*Primary Examiner* — Jamares Q Washington
(74) *Attorney, Agent, or Firm* — Oliff PLC

(57) ABSTRACT

A transmission type color gradation chart comprising: a color chart member including at least one color bar wherein transmitted light exhibits chromatic color; and a gray gradation chart member wherein transmitted light exhibits achromatic color, and includes a plurality of transmission regions with different brightness, wherein the color chart member and the gray gradation chart member are stacked so that there is a duplicative transmission region wherein the color bar and the plurality of transmission regions overlap in planar view.

11 Claims, 13 Drawing Sheets

(56) References Cited

FOREIGN PATENT DOCUMENTS

| JP | 2018-187873 A | 11/2018 | | |
|---|---|---|---|---|
| WO | 2004/044639 A1 | 5/2004 | | |
| WO | WO-2017170910 A1 | * | 10/2017 | ............ G01J 3/0297 |

* cited by examiner

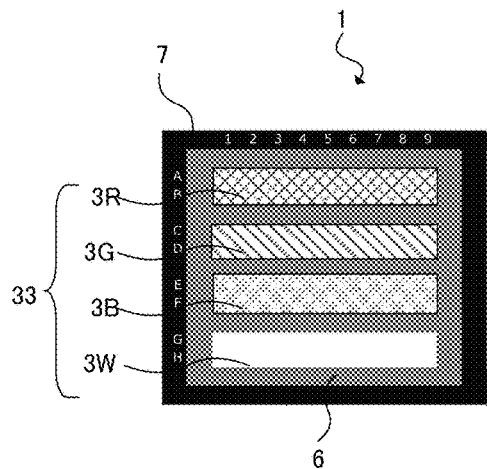
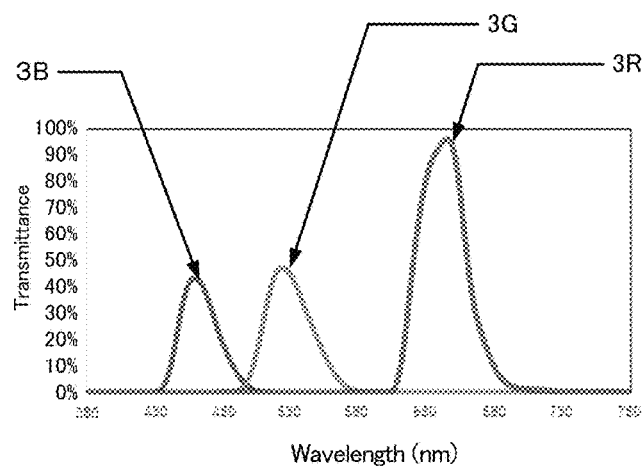
FIG. 2A
FIG. 2B
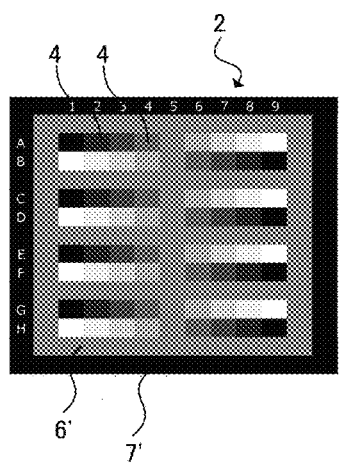
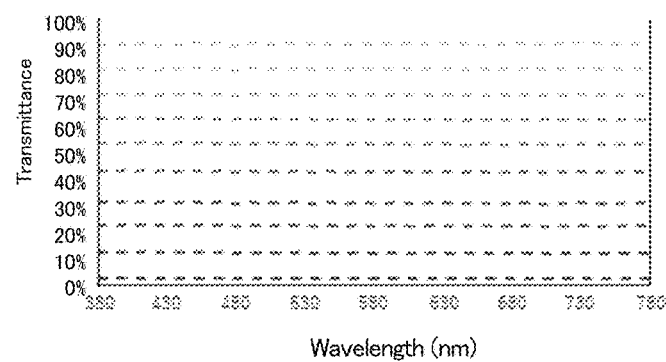
FIG. 3A
FIG. 3B

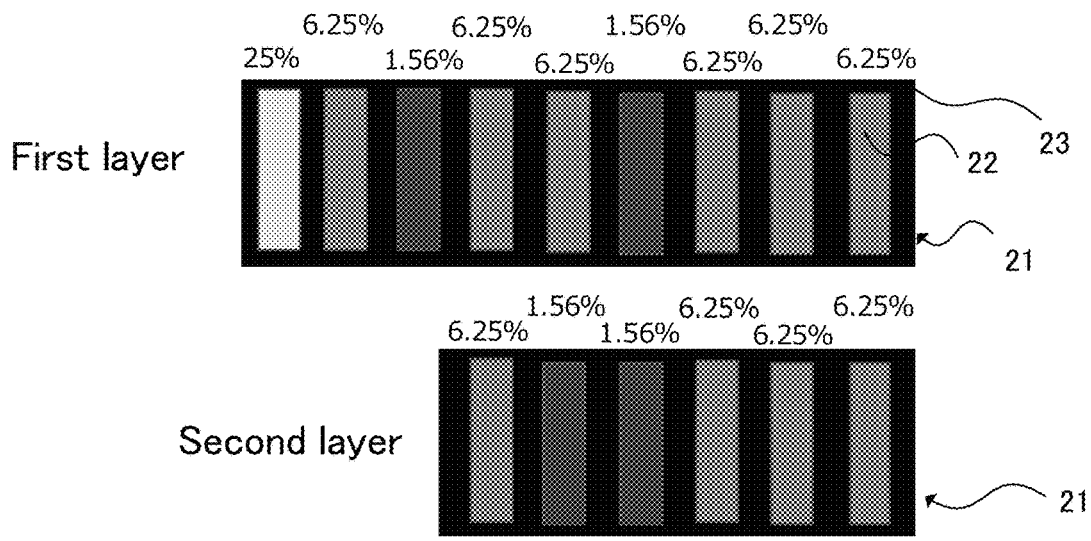
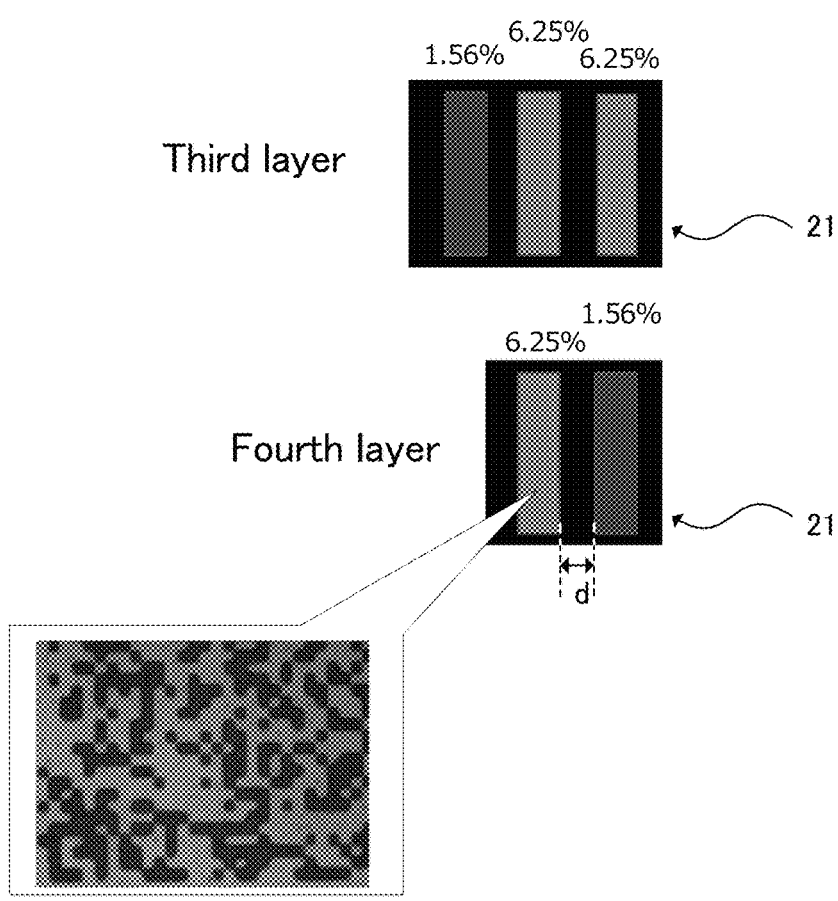
FIG. 9A
FIG. 9B
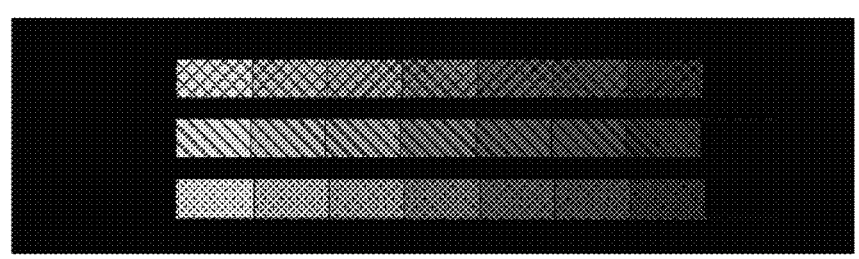
FIG. 9C

Wavelength (nm)

Gray step

TRANSMISSION TYPE COLOR GRADATION CHART, TRANSMISSION TYPE COLOR GRADATION CHART DEVICE AND GRAY GRADATION CHART

TECHNICAL FIELD

The present disclosure relates to a transmission type color gradation chart, particularly to a transmission type color gradation chart for an imaging device, a transmission type color gradation chart device, and a pray gradation chart.

BACKGROUND ART

In the field of imaging devices, output images are becoming increasingly high resolution, and regarding color, high color reproducibility that faithfully reproduces color tones is being sought, and the color gamut is being enlarged. That is, the reproduced color in the imaging devices is being enlarged. The color gamut is a specified range out of the visible region, and for example as illustrated in FIG. 13, can be expressed using the xy chromaticity diagram of the XYZ color system. (CIE 1931 XYZ color system) established by the CIE (International Commission on Illumination). In the xy chromaticity diagram, the color gamut can be indicated by a triangle formed by establishing chromaticity coordinates that are the peaks of each of the colors R, G and B and linking these with straight lines.

Color gamut conventionally have been established through various color gamut standards, and in the video industry including an imaging device, for example, standards that cover a broader color gamut such as BT.709 and BT.2020 standards as illustrated in FIG. 13 are used. Incidentally in the xy chromaticity diagram illustrated in FIG. 13, the CIE standard light source D65 which is a white spot is indicated with a white circle plot.

In an imaging device, in order to display an output image with appropriate color reproduction, the color reproduction in the imaging device and the color reproduction in a color chart such as a color chart disclosed in Patent Document 1, are compared, and calibrated based on the color chart when there is a difference in the color reproduction.

CITATION LIST

Patent Document

Patent Document 1: WO2004/044639

SUMMARY OF DISCLOSURE

Technical Problem

Here, in a conventional color gradation chart, the RGB values (0, 0, 0) to (255, 255, 255) obtained by dividing the contrast of each color of RGB in stages are assigned and used to design the color. Therefore, a color chart including brightness element is produced (FIG. 14A).

However, when the color chart produced according to the RGB value design is analyzed in detail, there is a problem that color shift occurs in actual products even when only brightness is reduced. FIG. 13 illustrates how the chromaticity position is shifted (saturation is shifted) on xy chromaticity diagram when the brightness is reduced (arrows in FIG. 13). Therefore, there is a need for a transmission type color gradation chart capable of carrying out more accurate color calibration.

The present disclosure has been made in view of the above circumstances, and a main object thereof is to provide a transmission type color gradation chart capable carrying out an accurate color calibration of an imaging device and the like.

Solution to Problem

That is, the present disclosure provides a transmission type color gradation chart comprising: a color chart member including, at least one color bar wherein transmitted light exhibits chromatic color; and a gray gradation chart member wherein transmitted light exhibits achromatic color, and includes a plurality of transmission regions with different brightness, wherein the color chart member and the gray gradation chart member are stacked so that there is a duplicative transmission region wherein the color bar and the plurality of transmission regions overlap in planar view.

According to the present disclosure, adjustment of color including the brightness may be carried out precisely, and it is capable of carrying out an accurate color calibration of an imaging device.

Also, in the present disclosure, a covered portion in the plurality of transmission regions is preferably formed using a black colorant or a metal. The reason therefor is to enable a precise color adjustment by using chromatic color of a plurality of colors.

Further, in the present disclosure, the plurality of transmission regions is preferably constituted with a dotted region having transmissivity wherein light shielding dots are randomly placed. The reason therefor is to enable more accurate brightness adjustment.

Furthermore, in the present disclosure, a spacer is preferably placed between the color chart member and the gray gradation chart member, and the spacer preferably includes an opening portion in the duplicative transmission region. The reason therefor is to suppress appearance of a Newton's ring due to occurrence of a gap, with the distance of the thickness of the spacer, between the color chart member and the gray gradation chart member.

Still more, in the present disclosure, a field angle determination mark for determining a field angle of an imaging device to be calibrated by the transmission type color gradation chart, is preferably formed on a main surface, different from a gray gradation chart member side main surface, of the color chart member. Thereby, when the imaging device is calibrated, since the transmission type color gradation chart is used in a condition wherein the color chart member side is on the imaging device side, an effect of suppressing the chromatic distortion may provided by focusing on the color chart member surface, as described above.

In the present disclosure, a distance between the adjacent transmission regions in the plurality of transmission regions is preferably a half or more of the width of the transmission region. The reason therefor is to prevent incursion of the leaked light from t e adjacent transmission region so as to enable more accurate calibration.

The present disclosure also provides a transmission type color gradation chart device comprising: two protective substrates; and the transmission type color gradation chart described above sandwiched between the two protective substrates. Thereby adhesion or physically contact f a solvent and the like to the color chart member or the gray gradation chart member may be suppressed so that occurrence of a defect such as a decrease of the color density f the color bar of the color chart member, and pigmentation changes may be suppressed.

The present disclosure also provides a gray gradation chart comprising stacked gray gradation chart structures including a plurality of transmission regions with different brightness aced therein so that the plurality of transmission regions overlap in planar view, and the plurality of transmission regions is constituted with dotted region having transmissivity wherein light shielding dots are randomly placed.

The present disclosure is able to provide a gray gradation chart capable of calibrating the brightness, that is light transmittance precisely and easily.

In the present disclosure, a distance between the adjacent dotted regions is preferably a half or more of the width of the dotted region. The reason therefor is to prevent incursion the leaked light from the adjacent dotted region so as to enable more accurate calibration.

Advantageous Effects of Disclosure

The transmission type color gradation chart in the present disclosure provides effects that adjustment of color including the brightness may be carried out precisely and easily, and it is capable of carrying out an accurate color calibration of an imaging device and the like.

BRIEF DESCRIPTION OF DRAWINGS

FIG. 2A is a schematic top view illustrating an example of a color chart member in the present disclosure, and FIG. 2B is an imaging graph illustrating the transmittance for each wavelength shown by the color chart member of FIG. 2A.

FIG. 3A is a schematic top view illustrating an example of a gray gradation chart member in the present disclosure, and FIG. 3B is an imaging graph illustrating the transmittance for each wavelength shown by the gray gradation chart member of FIG. 3A.

FIG. 9A is a schematic view illustrating an example of a gray gradation chart structure in the present disclosure, FIG. 9B is an enlarged photograph of the dotted region in FIG. 9A, and FIG. 9C is a schematic top view of a transmission type color gradation chart using the gray gradation chart structure of FIG. 9A.

DESCRIPTION OF EMBODIMENTS

As described above, the reproduced color in the imaging device is being enlarged in recent years, and higher accuracy is required in the color calibration of an imaging element.

Meanwhile, by analyzing a color chart member produced according to a RGB value design based on a conventional RGB contrasting density in detail, the present inventors have found out that, a design wherein only the brightness is decreased in the same color, there is a problem that discrepancies arise in actual saturation.

Figure 14A:
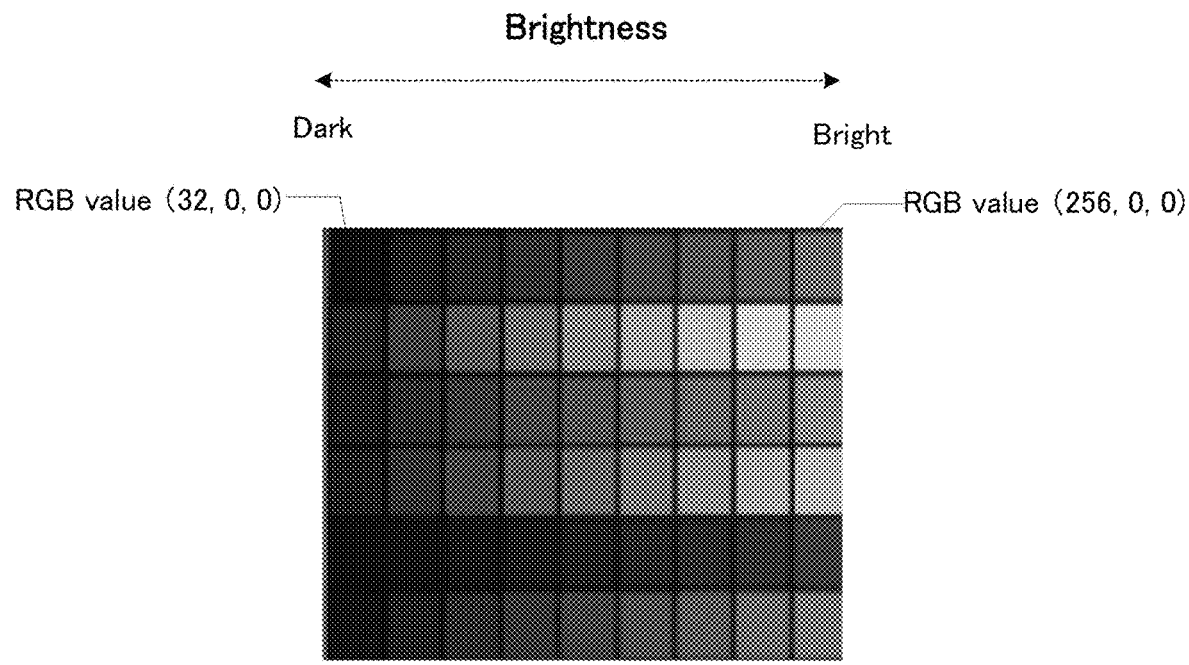
FIG. 14A is a schematic top view of a conventional color chart member.
Figure 14B:
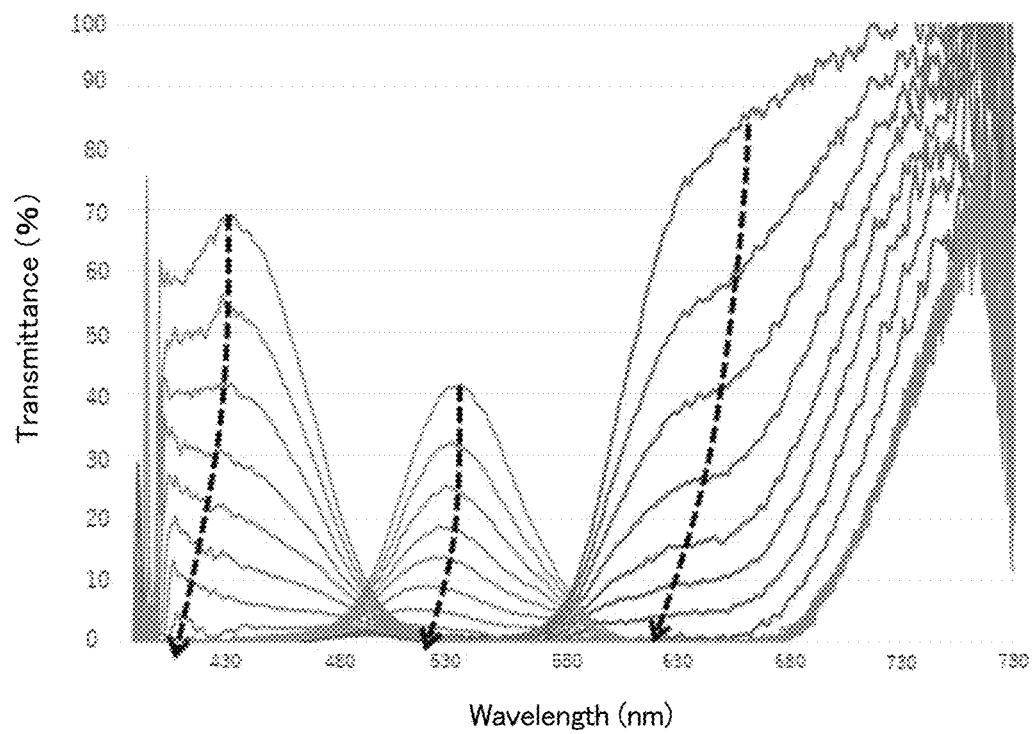
FIG. 14B is an imaging graph illustrating an example of the transmittance for each wavelength shown by a conventional color chart member.

In other words, the present inventors have found out that, as illustrated in FIG. 14B, the peak wavelength of the transmission spectrum of a conventional color chart member is shifted as the transmittance decreases so as to cause a noise. That is, the present inventors have found out that discrepancies arise in the saturation of a color chart member produced according to a RGB value design, particularly in low brightness.

In order to solve the above problems, the present inventors earnestly conducted research and have found out that the adjustment the brightness and the adjustment of the saturation may be carried out simultaneously by combining and stacking a color chart member and a gray gradation chart member so that the transmission type color gradation chart is capable of carrying out an accurate color calibration of an imaging device. Hereinafter, a transmission type color gradation chart in the present invention will be described.

A. Transmission Type Color Gradation Chart

The transmission type color gradation chart in the present disclosure is a transmission type color gradation chart comprising: a color chart member including at least one color bar wherein transmitted light exhibits chromatic color; and a gray gradation chart member wherein transmitted light exhibits achromatic color, and includes a plurality transmission regions with different brightness, wherein the color chart member and the gray gradation chart member are stacked so that there is a duplicative transmission region wherein the color bar and the plurality transmission regions overlap planar view.

Figure 1A:
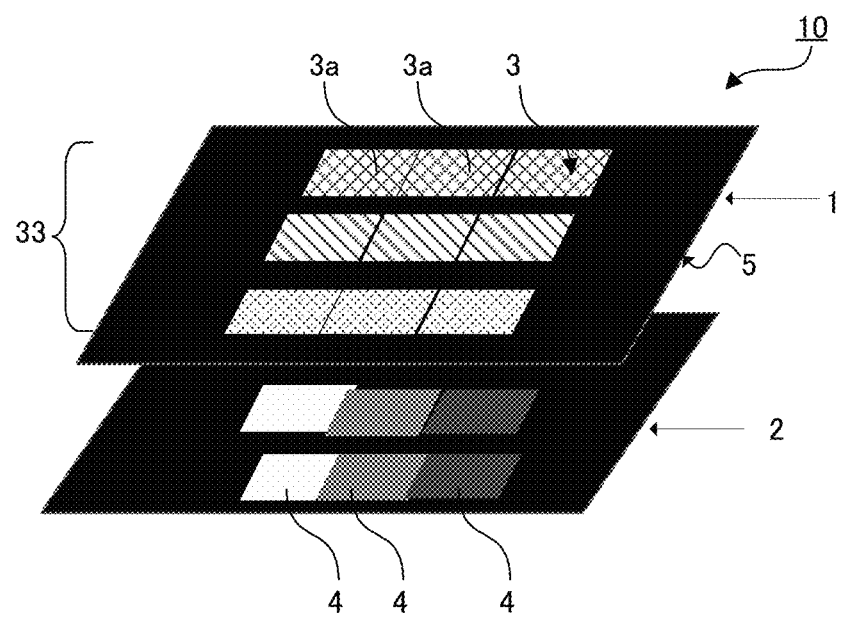
FIG. 1A is a schematic view illustrating an example a transmission type color gradation chart in the present disclosure.
Figure 1B:
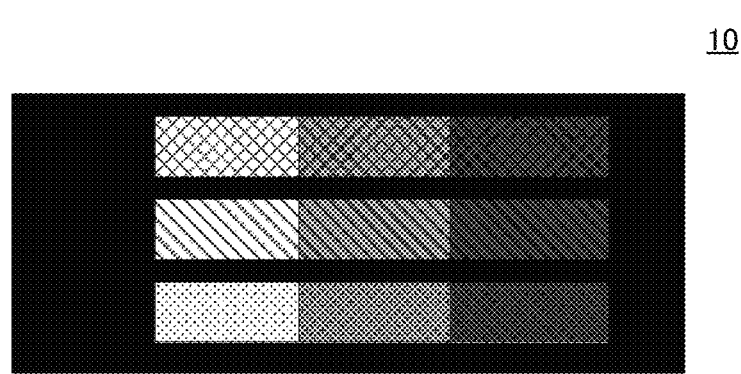
FIG. 1B is a schematic top view of a transmission type color gradation chart in the present disclosure.

The transmission type color gradation chart in the present disclosure will now be described by referring to the drawings. FIG. 1A is an explanation view explaining a transmission type color gradation chart in the present disclosure, and FIG. 1B is a schematic top view of a transmission type color gradation chart in the present disclosure.

As illustrated in FIG. 1A, transmission type color gradation chart 10 in the present disclosure comprises color chart member including transparent substrate 5, and at least one color bar 3, formed on the transparent substrate that exhibits chromatic color; and gray gradation chart member 2 that exhibits achromatic color, and includes a plurality of transmission regions 4 with different light transmittance, wherein the color chart member 1 and the gray gradation chart member 2 are placed so that there is a duplicative transmission region wherein at least one or more color bar 3 in the color chart member 1 and the plurality of transmission regions 4 with different light transmittance in the gray gradation chart member 2 overlap in planar view.

In FIGS. 1A and 1E, three transmission regions 4 are placed for each color bar so as to overlap in planar view, and as a whole, nine transmission regions 4 for three color bars 3 placed so as to overlap in planar view are illustrated. In this case, the transmission type color gradation chart 10 includes nine calibration patches.

Hereinafter, the respective configurations of the transmission type color gradation chart in the present disclosure will be described.

1. Color Chart Member

The color chart member in the present disclosure includes at least one color bar wherein the transmitted light exhibits chromatic color. The transmission type color gradation chart in the present disclosure will now be described by referring to the drawings. FIG. 2A is a schematic top view illustrating an example of a color chart member in the present disclosure. FIG. 2B is an imaging graph illustrating an example of the transmittance for each wavelength shown by the color chart member of FIG. 2A.

As illustrated in FIG. 2A, color chart member 1 in the present disclosure includes a transparent substrate (not shown) and color bar 3 exhibiting at least one chromatic color formed on the transparent substrate. In FIG. 2A, color bars of four colors of red color bar 3R, green color bar 3G, blue color bar 3B, and white color bar 3W are formed. Color bar group 33 is constituted with these four colors of color bars placed in a pattern in no particular order. Color chart light shielding portion 6 is provided around the color bars of respective colors on the transparent substrate 5. Color chart holding frame 7 is placed on the outer periphery of color bar group 33 and the color chart light shielding portion 6. Incidentally, the white color bar 3W is usually transparent.

Hereinafter, such a color chart member will be described in detail.

(1) Color Bar

In the color bar in the present disclosure, the transmitted light exhibits chromatic color, and at least one or more color bar is formed. When a color bar of a plurality of colors is formed, they form a color bar group placed in a pattern in no particular order.

Such a color bar is not particularly limited, and is usually formed on a transparent substrate.

(a) Type of Color Bar

The color bar placed in the color chart member used in the present disclosure may be, for example, a total of four color bars (color bar group) including three primary colors and white as illustrated in FIG. 2A described above, and may be only one color bar exhibiting one chromatic color. In the color chart member in the present disclosure, the number and the type of the color bar may be appropriately selected according to the application.

For example, when calibrating an imaging element capable of expressing a wide color gamut such as BT.709 or PT.2020, it is preferable to use a color chart member corresponding thereto. Specifically, color bar group described in Japanese Patent Application Laid-Open No. 2017-187756 may be employed. Hereinafter, a color chart member used for such an application will be described.

In the transmission type color chart member, light entering from the back surface is dispersed according to the selective transmittance of the color bar exhibiting chromatic color, except for white (W), constituting color bar group, and transmission spectrum each color appears respectively in the visible light region. As color bar group of the color chart member in the present disclosure, it is preferable that the transmission spectrum of color bar of each color has respectively separated peak top. "The transmission spectrum of color bar of each color has a respectively separated peak top" means that, as illustrated in FIG. 23 for example, the transmission spectrum of each color of red (R), green (G), and blue (B) color bar respectively has independent chevron waveform. This is because the brightness of color bar group may be made even by making the transmission spectrum of each color bar constituting the color bar group a chevron waveform.

The transmission spectrum of the color bar of each color may be obtained by measuring the transmittance in the visible light range of 380 nm to 780 nm using a white color bar that is colorless (transparent) as a background, with a microscopic spectrometer OSP-SP200 from Olympus Corporation or 2D Spectroradiometer SR-5000 from Topcon Technohouse Corporation (the light source is optional).

Also, in the present disclosure, it is preferable that the transmission spectrum of the color bar of each color constituting the color bar group except for W is placed in a well-balanced manner with peaks at a desired interval in the visible light region.

Specifically, color chart member of the following aspects described in JP-A No. 2017-187756 described above may be used.

That is, the following may be used: color chart member including a transparent substrate; and a color bar group formed on the transparent substrate; wherein the color bar group is constituted by color bars of at least the six colors of red, green, blue, a first color, a second color and white arranged in a pattern in no particular order; coordinate points of the first color are within a region encompassed by the four points (0.351, 0.649), (0.547, 0.453), (0.380, 0.506) and (0.433, 0.464) on an xy chromaticity diagram; coordinate points of the second color are within a region encompassed by the four points (0.125, 0.489), (0.112, 0.229), (0.270, 0.407) and (0.224, 0.242) on an xv chromaticity diagram; the peak wavelength of the transmission spectrum of the red color bar is 600 nm or more and 680 nm or less; the peak wavelength of the transmission spectrum of the green color bar is 495 nm or more and 570 nm or less; the peak wavelength of the transmission spectrum of the blue color bar is 430 nm or more and 490 nm or less; the peak wavelength of the transmission spectrum of the color bar of a first color (yellow (Ye) color bar) is 540 nm or mpre and 595 nm or less; and the peak wavelength of the transmission spectrum of the color bar of a second color (cyan (Cy) color bar) is 470 nm or more and 515 nm or less.

The transmission spectrum of the color bar of the first color and the transmission spectrum of the color bar of the second color respectively has independent peak tops, and may have chevron waveform. Also, the transmission spectra of R, G, and B color bars usually have respective peak tops separated from each other, and may have chevron waveforms.

Upon formation of the color bar of each color, the peak wavelength position of the transmission spectrum of the color bar may be adjusted according to the type of the color bar and a method for forming thereof.

For example, when a dyed substrate using one kind of dye is used as the color bar, the peak wavelength of the transmission spectrum of the color bar may also be adjusted by adjusting the concentration of the dye.

Also, when a dyed substrate formed by blending two or more kinds of dyes is used as a color bar, the peak wavelength of the transmission spectrum of color bar may be adjusted by changing the blending ratio of the two kinds of dyes. Specifically, when it is green (G) bar, it may be formed by a dyeing method using two kinds of yellow dye and blue dye, and the peak wavelength position may be adjusted, by increasing the blending ratio of the yellow dye to shift the peak wavelength to the longer wavelength side, and by increasing the blending ratio of the blue dye to shift the peak wavelength to the shorter wavelength side.

(b) Size of Color Bar

The size, for example, of the color bar is not particularly limited, and may be appropriately designed according to the use application, for example, of the transmission type color gradation chart in the present disclosure so that desired effects may be easily obtained. For example, the size of the transmission type color gradation chart in the present disclosure may be designed according to the photograph d image to be adapted. Specifically, when the transmission type color gradation chart in the present disclosure is used for the color evaluation and color correction of an output image of a measurement sample imaged via a microscope of a pathology imaging device, it may be a micro imaging color chart wherein a color bar group of a size corresponding to magnifications of the objective lens of the microscope, is formed.

Also, when the transmission type color gradation chart in the present disclosure is used, for example, for the color evaluation and color correction of an output image of a measurement sample taken by an imaging device at an equal magnification, it may be a macro imaging color chart wherein a color bar group of a size corresponding to the taken image size, is formed.

Specifically, the color bar may have a longitudinal length of 250 mm to 3.5 mm and a minor length of 190 mm to 0.8 mm.

(c) Others

In the color bar group in the present disclosure, the color bars of each color are placed in a pattern in no particular order. The color bars of each color may be arranged in a line pattern in one line as illustrated in FIGS. 1A and 1B and FIG. 2A, and may be arranged in a grid pattern or a circle, although not illustrated. The order of arrangement of the color bars of each color is not particularly limited, and may be appropriately designed according to the use, for example, of the transmission type color gradation chart in the present disclosure so that desired effects may be easily obtained.

As illustrated in FIG. the color bars of each color may be those divided into a plurality per region 3a overlapping in planar view on each transmission region 4 of gray gradation chart member 2 to be described later, and it may not be divided.

As described above, when the color is divided into a plurality of parts, it is generally preferable that a color chart light shielding portion, which will be described later, is placed in the divided part.

The color bars of each color may be a member exhibiting a desired transmission spectrum, and may be formed by a conventionally known method such as vapor deposition, dyeing, printing, transfer, and ink jet. In particular, in a method for forming a color bar by a dyeing method, for example, the color bars of each color may be formed by using a silver salt emulsion prepared by adding potassium bromide to a solution of silver nitrate in addition to gelatin; and then removing the silver from the silver salt photographic dry plate obtained by coating a chip substrate such as a glass plate with the silver salt emulsion and drying; and dyeing with dyes according to the color of the color bar. Also, the dyed substrate may also be formed by mixing a dye in advance into gelatin (solution), and coating a chip substrate such as a glass plate with a material made into a predetermined color.

Also, the color bar group may be formed, for example, by arranging the color bars of each color formed by the method described above on one surface of a transparent substrate described later in a desired pattern, and sandwiching thereof between the transparent substrate a the cover glass.

(2) Transparent Substrate

Although the color bar in the present disclosure is not particularly limited, one formed on the transparent substrate is preferable. The transparent substrate used in the present disclosure is not particularly limited as long as the transparent substrate may support the color bar group and the color chart light shielding portion, and has a desired light transmissivity, and may be the same as the transparent substrate used in a conventionally known color chart member. Specifically, an inorganic substrate such as a glass substrate, and a resin substrate may be used. The resin substrate may be a film or a sheet in addition to a plate.

(3) Color Chart Light Shielding Portion

The color chart member in the present disclosure is generally provided with a color chart light shielding portion for defining the transmission region of the color bar.

Examples of such color chart light shielding portion may include, those arranged on a transparent substrate so as to surround the peripheral f the color bar, when the color bar is formed on the transparent substrate. Specific examples thereof may include the color chart light shielding portion 6 illustrated in FIG. 2A.

Figure 7:
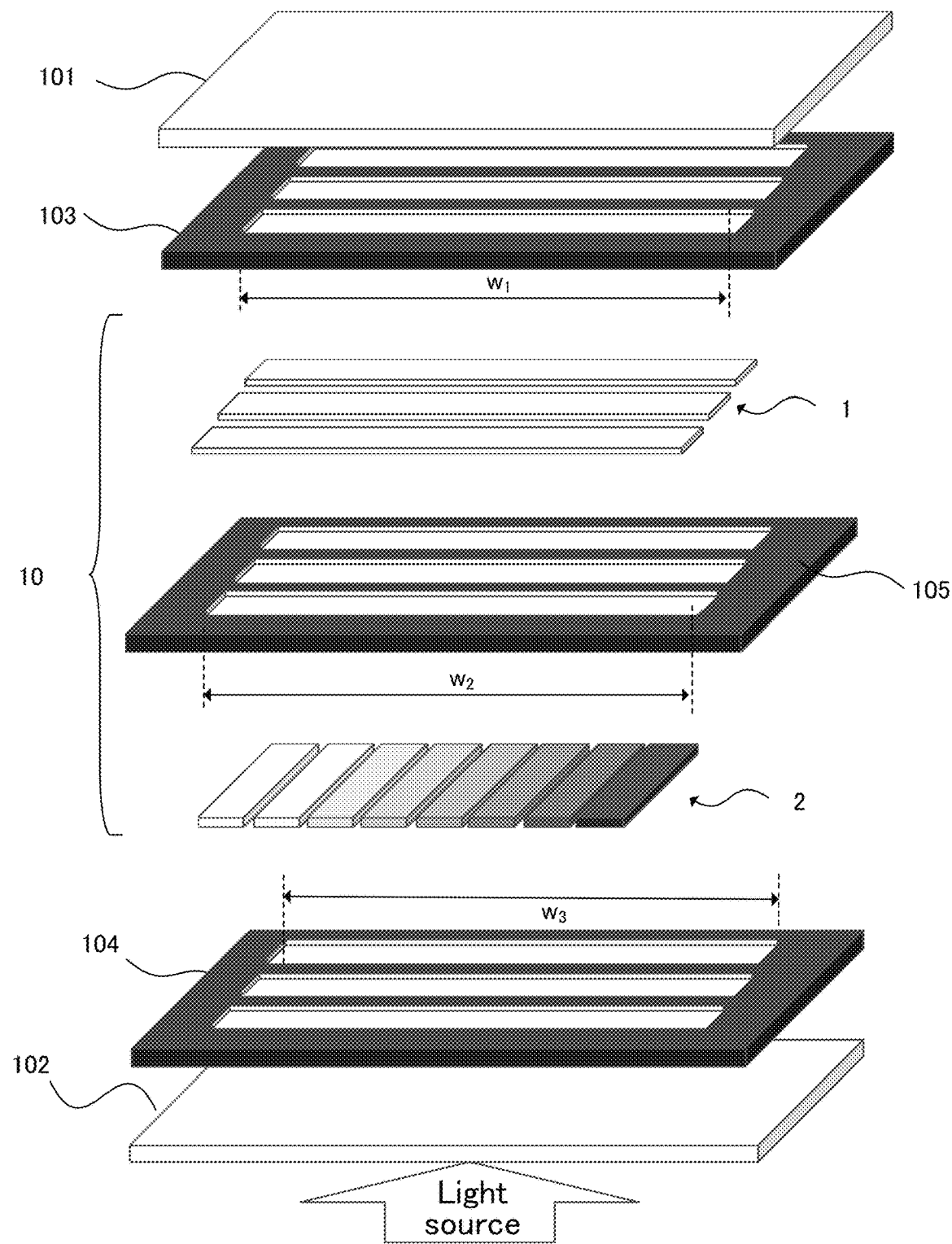
FIG. 7 is a schematic view illustrating an example of a transmission type color gradation chart device in the present disclosure.

Also, as illustrated in FIG. 7, a light shielding cover placed separately from the color bar may be used as a color chart light shielding portion.

As the color chart light shielding portion, any light shielding portion having a desired light shielding property may be used, and examples thereof may include a metal film such as a chromium thin film, and a printing layer formed of black ink.

As a method for forming the color chart light shielding portion, a conventionally known method may be used depending on a material to be used.

Also, as described above, when color bar 3 is divided and formed, for example, as illustrated in FIG. 1A, the color chart light shielding portion in the present disclosure may be placed so as to define the divided color bar 3a.

(4) Field Angle Determination Mark

Figure 6:
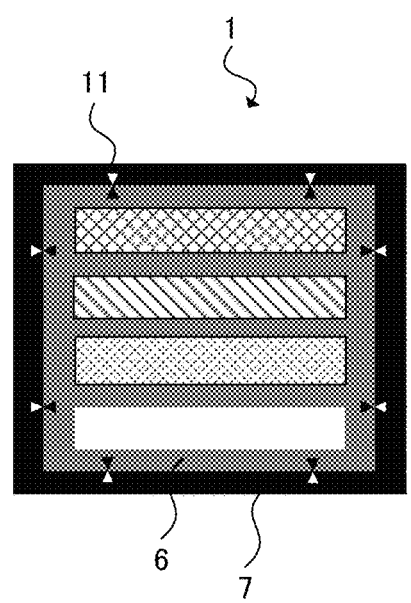
FIG. 6 is a schematic top view illustrating an example of a transmission type color gradation chart in the present disclosure.

In use, the transmission type color gradation chart in the present disclosure is placed so that the color chart member is located on the imaging device side. Therefore, the field angle determination mark for determining the field angle of the imaging device is formed on the surface opposite to the gray gradation chart member of the color chart member. FIG. 6 illustrates an example of the field angle determination mark, field angle determination mark 11 of the imaging element is provided on the surface opposite to the gray gradation chart member of the color chart member so as to point the boundary between the color chart light shielding portion 6 and the color bar holding frame 7.

The shape and size of the field angle determination mark 11 such an imaging element is not particularly limited as long as the shape and size of the degree that may be recognized as a mark indicating the field angle of the imaging element, and it may be appropriately adjusted according to the design, for example, of the transmission type color gradation chart.

Meanwhile, since the gray gradation chart member is placed so as to be located on the light source side, such field angle determination mark is usually not provided.

(5) Others

Also, the color chart member in the present disclosure may include an IR-cut filter. When the color bars of each color are formed by the dyeing method, due to the characteristics of the dyes, the light tends to be transmitted easily in the wavelength region of transmission spectrum of 650 nm or more so as to have a high light transmittance. The light of wavelength of approximately 650 nm or more is hardly absorbed by the dye used for the color bars of yellow (Ye), orange (O), and red (R), particularly. Therefore, in the long wavelength range, the transmission spectrum of each color overlaps.

Meanwhile, by combining an IR-cut filter for removing a predetermined range with the color bar, the transmission spectrum or each color may be separated, and color mixing may be prevented.

The IR-cut filter may be selected by considering the wavelength range to be blocked, according to the transmission spectrum property of the color bar of each color. A conventionally known filter may be used as the IR-cut filter.

In addition to the above-described configuration, the color chart member in the present disclosure may include, for example, an alignment mark, an identification code, a cover glass, a color bar holding frame, and a transparent protective plate with a light shielding portion.

The identification code may be, for example, a code that records information or the like of a test chart. The alignment mark may be a mark wherein the location information is recorded, and may further function as an identification code wherein the information of a test chart or the like is recorded. These may be provided on a transparent protective plate with a light shielding portion.

2. Gray Gradation Chart Member

The gray gradation chart member in the present disclosure will now be described with reference to the drawings. FIG. 3A is a schematic top view illustrating an example of a gray gradation chart member, and FIG. 3B is an imaging graph illustrating the transmission spectrum of each transmission region of the gray gradation chart member of FIG. 3A.

As illustrated in FIG. 3A, gray gradation chart member 2 in the present disclosure includes a plurality of transmission regions 4 exhibiting achromatic color and different brightness. In FIG. 3A, eight brightness gradation regions including total of eight of a plurality of transmission regions 4 with different brightness are formed. Around the brightness gradation regions, gray gradation chart light shielding portion 6' is provided. On the outer periphery of the gray gradation chart light shielding portion 6', gray gradation chart holding frame 7' is placed.

Hereinafter, such a gray gradation member will be described in detail.

(1) Plurality of Transmission Regions

As illustrated in FIG. 3A, the gray gradation chart member in the present disclosure includes a plurality of transmission regions 4 different in light transmittance. A plurality of transmission regions in the gray gradation chart member is placed so as to include a region overlapping in planar view with at least one color bar in the color chart member.

(a) Shape of Plurality of Transmission Regions

The arrangement of the transmission region for each transmittance gradation is not particularly limited, and may be arranged in a row or a grid so that the transmittance changes stepwise. For example, the transmission regions may be arranged so that the transmittance decreases from the maximum light transmittance portion (most white portion) to the minimum light transmittance portion (most black portion).

In FIGS. 1A and 1B, one color bar 3 of color chart member 1, three transmission regions 4 of gray gradation chart member 2 are placed so as to overlap in planar view. When stacking the color chart member of FIGS. 2A and 2B and the gray gradation chart member of FIGS. 3A and 3B, each color bar 3, and total of 16 transmission regions included in the two side-by-side brightness gradation regions of the gray gradation chart member 2 corresponding thereto are placed so as to overlap in a planar view. As described above, the number of the transmission region in the gray gradation chart member overlapping one color bar in planar view is not particularly limited as long as it is plural, and may be, for example, 2 or more and 256 or less.

The shape of each transmission region in planar view is not particularly limited, and usually, it may be a rectangular shape.

The size of each transmission region may be suitably designed to facilitate the desired effects according to the application of the transmission type color gradation chart in the present disclosure, and for example, it may be 250 mm×190 mm to 3.5 mm×0.8 mm.

A plurality of transmission regions with different light transmittance those overlapping one color bar in planar view may be formed successively, and the transmission regions with different transmittance are preferably formed separately. This is because, by forming the transmission regions with different transmittance separately, the influence of the leaked light from the adjacent transmission region may be suppressed so that accurate calibration may be carried out.

Figure 15:
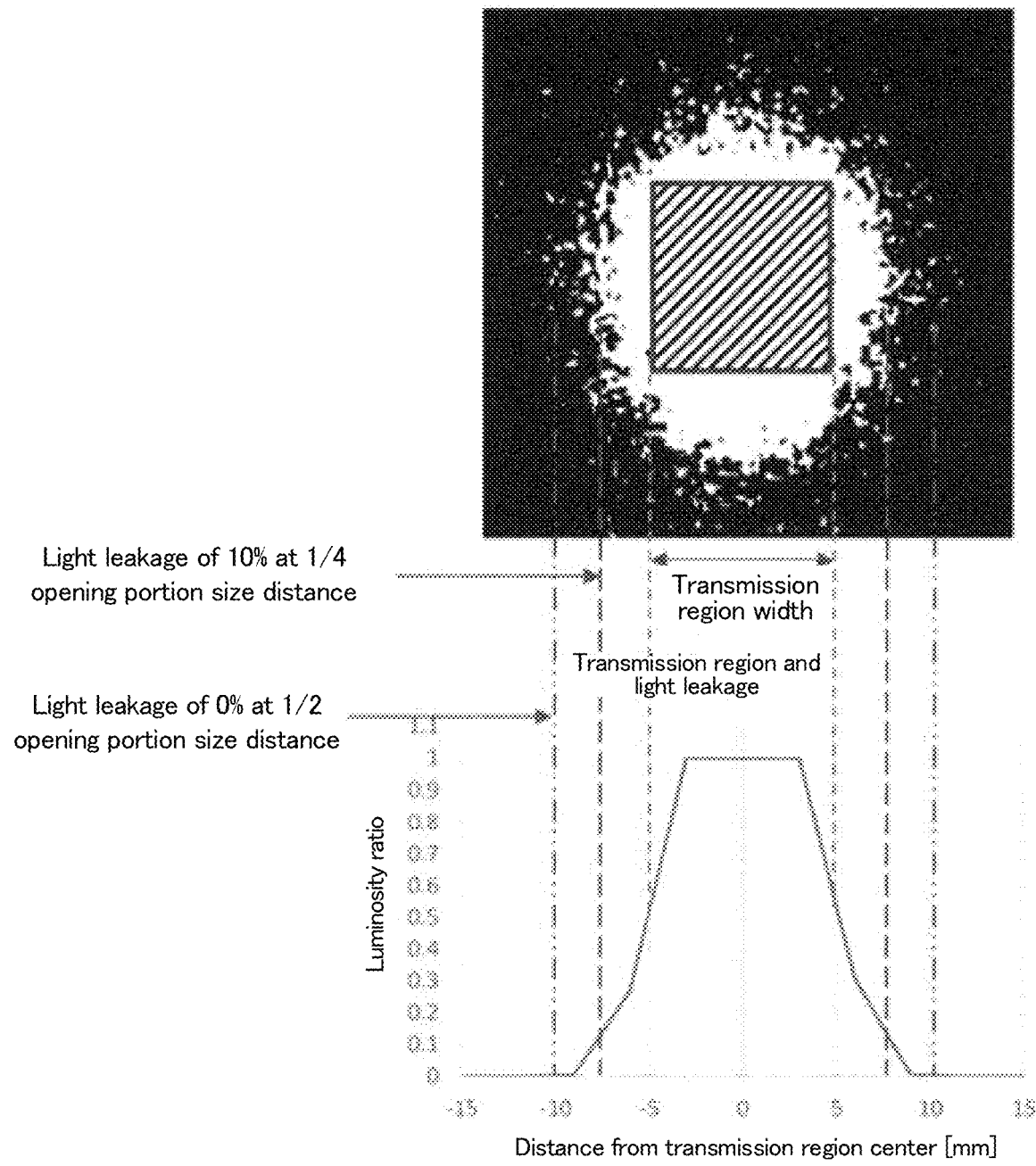
FIG. 15 is a light intensity diagram measuring a degree of leaking light when light is irradiated to a transmission region.

FIG. 15 is the result (brightness distribution is indicated in a two-dimensional map) of a measurement wherein HDR (High Dynamic Range) a gradation chip having a transmission region size of 10 mm×10 mm (corresponding to one transmission region of the gray gradation chart member) is measured by a 2D Spectroradiometer SR-5000 from Topcon Technohouse Corporation, when irradiated with a light source of 4500 cd/m² luminosity. As illustrated in FIG. 15, the amount of leaked light out from the transmission region is approximately 10% of the transmission region at the location 5 mm away from the transmission region, and almost nothing at the location 10 mm away from the transmission region.

That is, when irradiated with a light source of 4500 cd/m² luminosity, the light leakage out from the transmission region is approximately 10% of the transmission region at the location away from the edge of the transmission region by a distance of a half of the width of the transmission region, and almost nothing at the location away from the edge of the transmission region by a distance same as the width of the transmission region. Incidentally, the luminosity ratio shown on the vertical axis of the graph in the figure shows the luminosity ratio of the surrounding region, when the luminosity of the transmission region is regarded as 1.

From the experimental results described above, when the transmission regions with different transmittance is formed separately, the distance between adjacent transmission region with different transmittance is preferably a half or more of the width of the transmission region, and the distance is particularly preferably the same as the width of the transmission region or more.

Incidentally, the width of the transmission region means the distance from transmission region side portion adjacent to said transmission region to the side portion opposite to said side portion, among the side portions defining said transmission region.

This is because light leakage between adjacent transmission regions may be avoided by setting the value to the above value or more. Incidentally, when the transmission region is formed separately as described above, the gray gradation chart light shielding portion, which will be described later, is usually formed between the adjacent transmission regions.

(b) Configuration of Plurality of Transmission Regions

The gray gradation chart member is not particularly limited as long as it includes a plurality of transmission regions with different light transmittance, and examples thereof may include a plurality of metallic films having different thicknesses formed on a transparent support having light transmissivity such as a glass and a film; a stripe or a halftone dot covered portion formed on a transparent support; a silver salt film; and a stacked product thereof.

Figure 16:
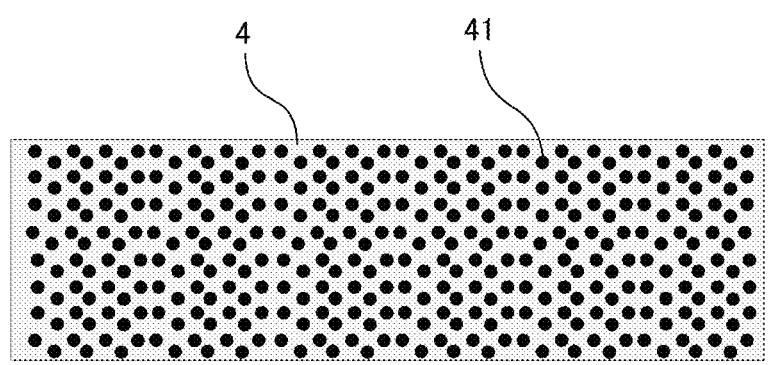
FIG. 16 is a schematic top view illustrating an example of a covered portion in a transmission region.

FIG. 16 illustrates an example of a covered portion, and illustrates an enlarged example of the transmission region 4 wherein the halftone dot covered portion 41 is formed.

The covered portion in such a plurality of transmission region is preferably formed using a black colorant, or a paper, a film, a glass, or a metal colored in black. This is because those formed using a plurality of chromatic colors as a light shielding region in the plurality of transmission regions may cause a noise in the saturation of the transmitted light.

The gray gradation chart member in the present disclosure is preferably a gray gradation chart structure including a dotted region having transmissivity wherein light shielding dots are randomly placed, and a gray gradation chart light shielding portion placed around thereof; or a stacked product of these gray gradation chart structures. This is because brightness may be adjusted accurately, and appearance of moire may be prevented when the gray gradation chart structures are stacked in order to accurately adjust the brightness.

The gray gradation chart structure will be described in detail in the section "C. Gray gradation chart" which will be described later.

(c) Others

Examples of a meth forming a gray gradation chart member may include a sputtering method wherein a plurality metal films having different thicknesses are formed on a transparent support such as a glass or a film; and a printing method, an ink jet method, and a photolithography method, for example, wherein stripe or halftone dot covered portions having different covering areas may be formed on a transparent support.

(2) Gray Gradation Chart Light Shielding Portion

In the gray gradation chart member in the present disclosure, a gray gradation chart light shielding portion is preferably provided on the outer periphery of the plurality of transmission regions, or on the outer periphery of each transmission region. By providing the gray gradation chart light shielding portion, the light may be prevented from sneaking from the side. Examples of the gray gradation chart light shielding portion may include one similar to those described in "1. Color chart member, (3) Color chart light shielding portion" above.

Also, as illustrated in FIG. 7, the light shielding cover placed separately from the plurality of transmission regions may be used as the gray gradation chart light shielding portion.

In the present disclosure, the area of the opening portion of the color chart light shielding portion is preferably smaller than the area of the opening portion of the gray gradation chart light shielding portion.

In the transmission type color gradation chart in the present disclosure, the color chart member and the gray gradation chart member are stacked to form a duplicative transmission region wherein the color chart light shielding portion and the gray gradation chart light shielding portion overlap in planar view. When calibrating an imaging device using the transmission type color gradation chart having such a configuration, the lighting device is placed on the gray gradation chart member side of the transmission type color gradation chart, and the imaging device is placed on the color chart member side. This is because when focusing on the transmission type color gradation chart in the imaging device, by focusing on the color chart member surface, the chromatic distortion may be suppressed. This is because, at this time, when the area of the opening portion of the color chart light shielding portion in the duplicative transmission region is equal to or more than the area of the gray gradation chart light shielding portion in the duplicative transmission region, both of the end portion of the color chart light shielding portion and the end portion of the gray gradation chart light shielding portion are photographed by the imaging device when calibrating by the imaging device, so that there is a possibility that a problem may occur in adjusting the focus, for example.

(3) Transparent Support

The plurality of transmission regions in the gray gradation chart member and the gray gradation chart light shielding portion are not particularly limited, and are preferably formed on a transparent support. Such a transparent support is not particularly limited as long as it is able to support the plurality of transmission regions and the gray gradation chart light shielding portion, and has a desired light transmissivity, and may be similar to a transparent substrate used for a conventionally known grayscale. Specifically, an inorganic substrate such as a glass substrate or a resin substrate may be used. The resin substrate may be a film or a sheet in addition to a plate shape.

(4) Others

In addition to the above-described configuration, the gray gradation chart member in the present disclosure may include, for example, an alignment mark, a cover glass, gray gradation chart holding frame, and a transparent protective plate with a light shielding portion.

3. Spacer

The transmission type color gradation chart in the present disclosure preferably includes a spacer placed between the color chart member and the gray gradation chart member, and this spacer preferably includes at least an opening portion in the region overlapping with the color bar in the color chart member in planar view. The reason therefor is to suppress appearance of a Newton's ring due to occurrence of a gap, with the distance of the thickness of the spacer, between the color chart member and the gray gradation chart member, by providing the spacer. Examples of the spacer may include a cardboard, and a film, for example, including at least an opening portion in the region overlapping with the color bar in planar view.

The thickness of the spacer is appropriately adjusted according to the size of the gap to be provided between the color chart member and the gray gradation chart member, and is not particularly limited. Specifically, it may be 10 μm or more, and preferably 20 μm or more. When the thickness the spacer is in the range described above, a gap to the extent that the appearance of Newton's ring may be suppressed, may be provided.

In the present disclosure, the spacer may be a light shielding cover to be described in the section "B. Transmission type color gradation chart device, 2. Light shielding cover" later. In this instance, the light shielding cover may have a function as the color chart light shielding portion and the gray gradation chart light shielding portion, and may be provided separately from the color chart light shielding portion and the gray gradation chart light shielding portion.

4. Others

The transmission type color gradation chart in the present disclosure is obtained by stacking the color chart member described in the section "1. Color chart member" above, and the gray gradation chart member described in the section "2. Gray gradation chart member" above, wherein at least one color bar in the color chart member and a plurality of transmission regions in the gray gradation chart member are placed so that there is a duplicative transmission region wherein they overlap in planar view.

The stacking of the color chart member and the gray gradation chart member is carried out in a condition wherein the spacer or the like is interposed therebetween as necessary, by, for example, a method fixing by an adhesive; a method fixing by a jig for a separate process; and a method using a solid adhesive capable of holding a gap.

The transmission type color gradation chart in the present disclosure includes a plurality calibration patches by stacking "1. Color chart member" and "2. Gray gradation chart member" as described above.

Figure 4:
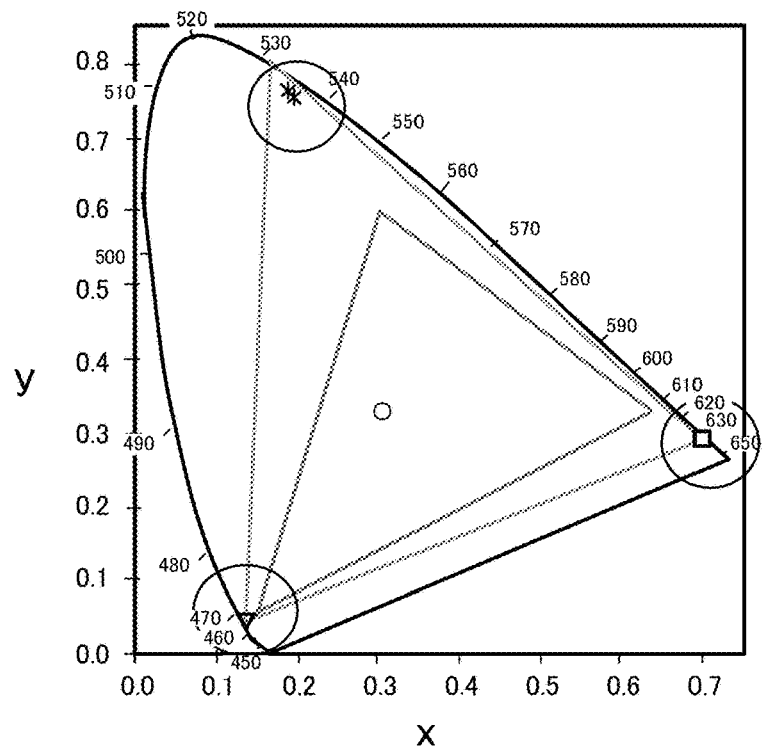
FIG. 4 is a xy chromaticity diagram illustrating a color gamut of the transmission type color gradation chart in the present disclosure.
Figure 5:
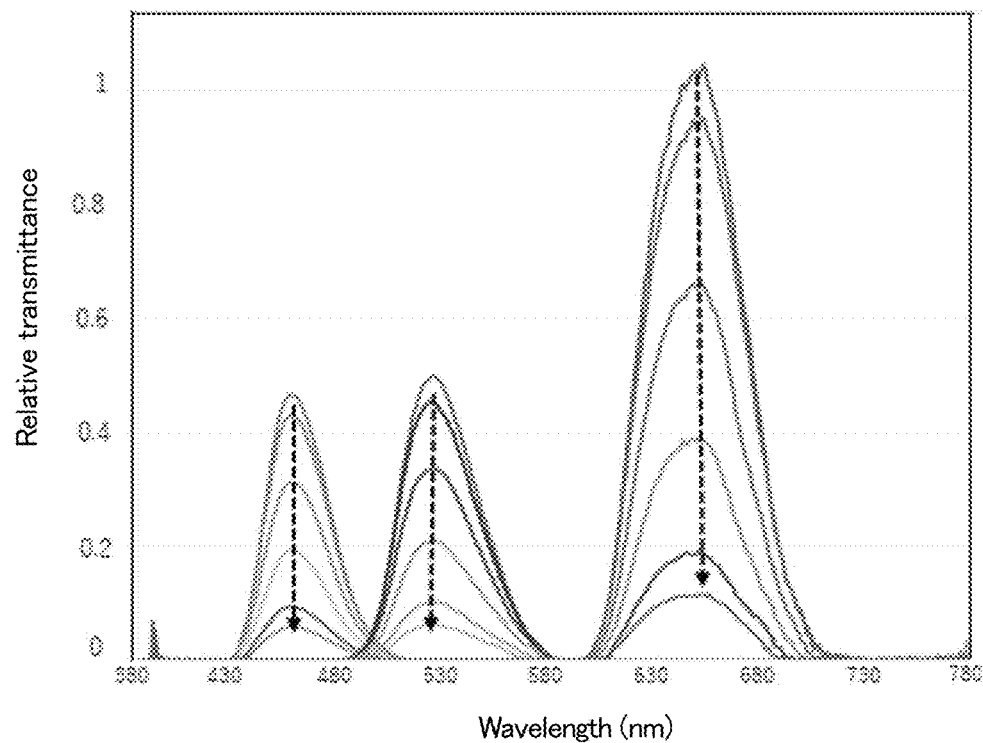
FIG. 5 illustrates transmittance for each wavelength shown by the transmission type color gradation chart in the present disclosure.

In such transmission type color gradation chart in the present disclosure, the color may be adjusted by the color chart member, the brightness may be adjusted by the gray gradation chart member, and the brightness may be adjusted without changing the saturation. Specifically, xy chromaticity diagram obtained by the transmission type color gradation chart in the present disclosure is illustrated in FIG. 4. Also, the transmission spectrum of each calibration patch obtained by the transmission type color gradation chart in the present disclosure is illustrated in FIG. 5. In FIG. 4, it is clear that the chromaticity position on xy chromaticity diagram is substantially unchanged even if the brightness is decreased. In FIG. 5, it is clear that the peak wavelength of the transmitted light is not sifted, and there is no noise, even when the brightness was low.

5. Method for Color Calibrating Using Transmission Type Color Gradation Chart

Figure 12:
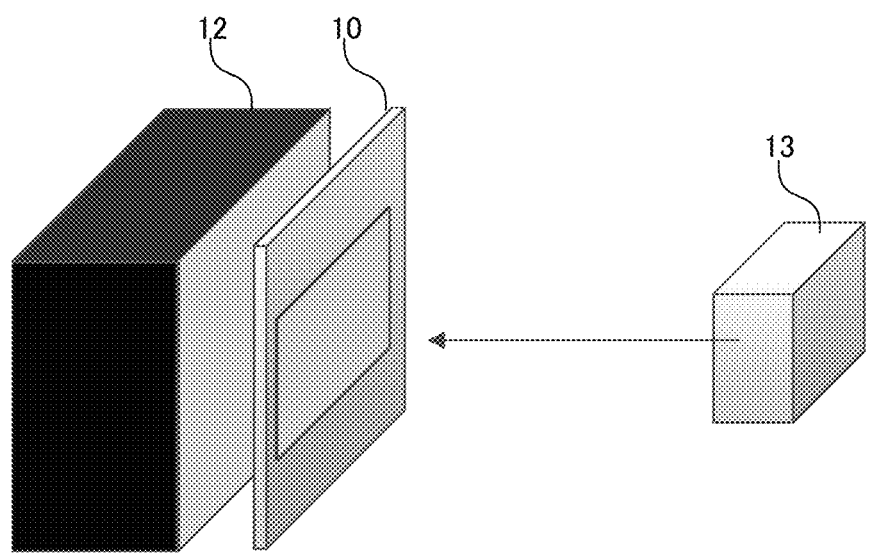
FIG. 12 is an explanation view explaining a method for using a transmission type color gradation chart in the present disclosure.
Figure 13:
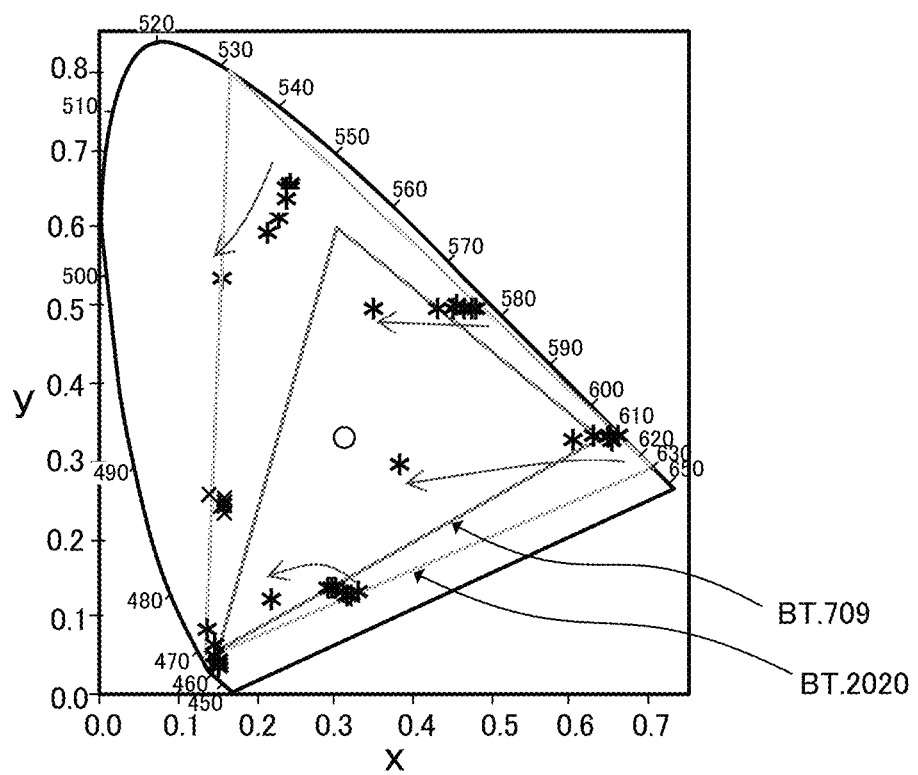
FIG. 13 is a xy chromaticity diagram illustrating a color gamut of a color chart member produced according to a conventional RGB value design.

The transmission type color gradation chart in the present disclosure may e used to calibrate, that is, to evaluate the color reproducibility of, for example, an imaging device such as a camera. To evaluate the color reproducibility the camera or the like, as illustrated in FIG. 12, lighting equipment 12 is firstly placed on one surface side of the transmission type color gradation chart 10.

Then, while irradiating the transmission type color gradation chart from one surface side by the lighting equipment 12, an image of the transmission type color gradation chart is taken by the camera 13 from the other surface side. After phot graphing the transmission type color gradation chart, the calculation circuit of the camera compares the calibration patch on the photographed image with the reference color patch previously stored in the storage portion of the camera, and calculates the evaluation value of the color reproducibility of the camera based on the chromaticity of the both. After the evaluation value of the color reproducibility is calculated, the color correction circuit of the camera corrects the parameters of the camera correlated with the color reproducibility so that the color difference is minimized, thereby calibrating the camera.

Here, the transmission type color gradation chart in the present disclosure is preferably used by placing thereof so that the color chart member is on the camera side, and the gray gradation chart member is on the lighting equipment side. This is because the chromatic distortion may be suppressed by focusing on the color chart member surface when focusing the camera on the chart.

6. Application

The transmission type color gradation chart in the present disclosure may be used for an imaging device, video equipment and necessary peripheral equipment in general, which require color calibration. Among these, it is suitably used for an imaging device for pathology.

B. Transmission Type Color Gradation Chart Device

The transmission type color gradation chart device in the present disclosure comprises two protective substrates; and the transmission type color gradation chart described above sandwiched between the two protective substrates.

Referring now to the drawings, the transmission type color gradation chart device in the present disclosure will be described. FIG. 7 is a schematic view illustrating an example of a transmission type color gradation chart device in the present disclosure. As illustrated in FIG. 7, transmission type color gradation chart device 100 in the present disclosure comprises the transmission type color gradation chart 10; protective substrate 101 placed on the color chart member 1 side of the transmission type color gradation chart (hereinafter, referred to as a first protective substrate); and protective substrate 102 placed on the gray gradation chart member 2 side of the transmission type color gradation chart (hereinafter, referred to as a second protective substrate). The first protective substrate 101 and the second protective substrate 102 are placed so as to face to each other via the color bar in the color chart member and the plurality of transmission regions in the gray gradation chart member, and includes at least a transmission portion at a region overlapping the color bar in the color chart member, in planar view.

In this manner, by having the above-mentioned structure wherein the transmission type color gradation chart is sandwiched between a pair of the protective substrates (that is the first protective substrate and the second protective substrate), it is possible to suppress the adhesion and the physical contact of a solvent or the like to the color chart member or the gray gradation chart member, so that it is possible to suppress the occurrence of defects such as a decrease in color density of the color bar of the color chart member, and a variation in the dye.

Hereinafter, each configuration of the transmission type color gradation chart device in the present disclosure will be described.

1. Protective substrate

The two protective substrates in the present disclosures are placed so as to face to each other via the transmission type color gradation chart. The protective substrate is preferably a member including at least a transmission portion at a region overlapping the color bar in the color chart member, in planar view. Here, the "transmission portion" refers to a region which transmits at least visible light.

The size of the protective substrate is appropriately selected according to the size of the transmission type color gradation chart device in the present disclosure, and is not particularly limited.

The material used for the protective substrate is preferably, for example, a material capable of protecting the color chart member and the gray gradation chart member sandwiched by a pair of protective substrates from scratches or dust. Specific examples of the protective substrate may include a transparent substrate such as glass and plastic. When the transmission type color gradation chart device in the present disclosure is used in a microscope with an imaging device, glass is usually used as the material for the protective substrate. Also, as the protective substrate, a transparent protective plate with a light shielding portion including a light shielding portion having the same pattern as that of the light shielding cover described later, may be used.

2. Light Shielding Cover

As illustrated in FIG. 7, in the transmission type color gradation chart device in the present disclosure, light shielding covers 103, 104 are preferably placed between the first protective substrate 101 and the transmission type color gradation chart 10, and between the second protective substrate 102 and the transmission type color gradation chart 10.

Hereinafter, the light shielding cover 103 between the first protective substrate 101 and the transmission type color gradation chart 10 is referred to as a first light shielding cover, and light shielding cover 104 between the second protective substrate 102 and the transmission type color gradation chart 10 is referred to as a second light shielding cover.

In this instance, the transmission type color gradation chart spacer described above may be configured with third light shielding cover 105.

Examples of the first to third light shielding covers may include a cardboard, and a film, for example, including at least opening portion in the region overlapping with the color bar in the color chart member in planar view.

The opening portion of each light shielding cover may be formed at a predetermined position described above, and for example, the position and the width of the opening portion in each light shielding cover may be the same, and may be different. In the present disclosure, the position and the width of the opening portion of each light shielding cover may be the same. This is because the outline of the color bar becomes clear and the transmission type color gradation chart device may have higher quality.

Also, when the position and the width of the opening portion of the light shielding cover differs, the regions of the spacer (third light shielding cover) and the second light shielding cover are preferably not observed from the observation side (camera side) of the transmission type color gradation chart device. Specifically, as illustrated in FIG. 7, when the width of the opening portion of the first light shielding cover 103 is regarded as $w_1$, the width of the opening portion of the spacer (third light shielding cover 105) is regarded as $w_2$, and the width of the opening portion of the second light shielding cover 104 is regarded as $w_3$, it is preferable to satisfy the relationship of $w_1 < w_2 < w_3$. By doing so, it is possible to prevent light leakage of light incident from the oblique.

In the example illustrated in FIG. 7, the first light shielding cover 103 and the second light shielding cover 104 also function as spacers, and may suppress Newton's ring caused by contacts between the protective substrate and the transmission type color gradation chart. Also, the third light shielding cover 105 is also intended to function as a spacer, and may suppress Newton's ring caused by contacts between the color chart member and the gray gradation chart member.

Also, specific size of the light shielding cover and width of the opening portion are appropriately adjusted according to the design of the transmission type color gradation chart device, and are not particularly limited.

3. Transmission Type Color Gradation Chart

The transmission type color gradation chart used in the transmission type color gradation chart device in the present disclosure may be the same as that described in "A. Transmission type color gradation chart" above, and therefore description thereof is omitted.

C. Gray Gradation Chart

Recently, image output devices of a dynamic range capable of acquiring the light and dark information of the subject with large light and dark difference with high resolution have been developed. Due to technological improvements in a display the peak luminosity is improved, and the dynamic range is enlarged. Specifically, the luminosity ratio in the conventional standard dynamic range (SDR) was 1:1000, whereas the luminosity ratio in the high dynamic range (HDR) is 1:100,000. Therefore, there has been a need for gradation charts capable of sensitive adjustment the transmittance of 0.0001% order at low brightness.

However, it was e emery difficult to obtain brightness that allows accurate calibration at low brightness since the conventional gray gradation chart adjusts brightness with a single gray gradation chart.

As the result of studies in this point, the present inventors have found out that there is a possibility of obtaining a brightness capable of accurate calibration at low brightness, by stacking gray gradation charts, and have carried out examinations thereof.

As the result of the examinations, it was newly found that, since the conventional gray gradation chart uses halftone dots or line-and-space patterns with regularlity the gray gradation chart using such regular patterns causes problems such as occurrence of interference fringes (moire) when stacked to adjust the transmittance.

Figure 8A:
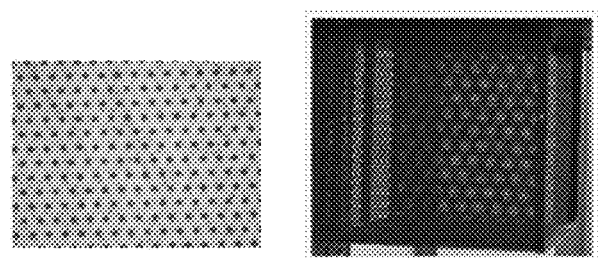
FIGS. 8A and 8B are photographs of interference fringes that appear when a conventional gray gradation chart member is used.
Figure 8B:
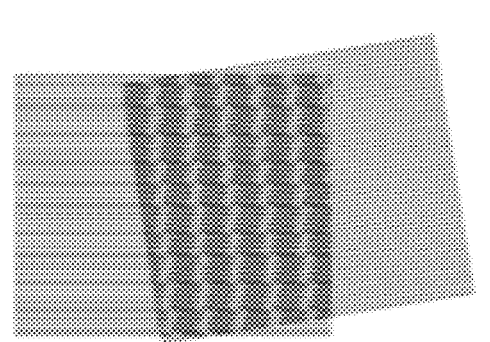
Figure 8C:
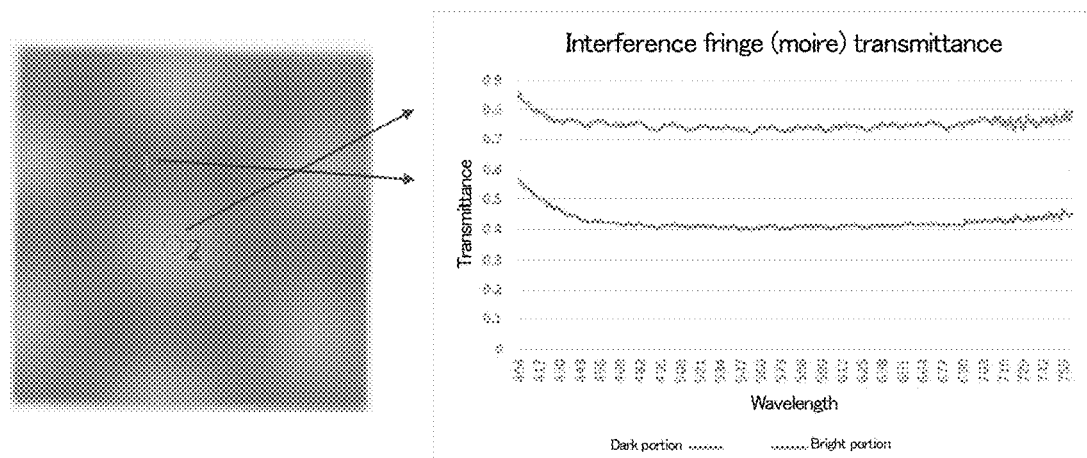
FIG. 8C is graph illustrating the transmittance for each wavelength shown by a conventional gray gradation chart member.

FIG. 8A illustrates interference fringes occur when halftone dots having regularity are used, and FIG. 8B illustrates interference fringes occur when a line-and-space pattern is used. In such fringes, the transmittance may vary minutely. Also, since transmittance of each wavelength differs, there has been a problem of possibility of defects when used in combination with the color chart member, as the gray gradation chart member of the transmission type color gradation chart described above. FIG. 8C illustrates the transmittance for each wavelength in the gray gradation chart of FIG. 8A.

The present inventors have achieved the object described above by using a gray gradation chart structures including a plurality of transmission regions with different brightness placed therein, wherein the plurality of transmission regions are constituted with a dotted region having transmissivity wherein light shielding dots are randomly placed, and stacking thereof.

That is, the gray gradation chart in the present disclosure is a gray gradation chart comprising stacked gray gradation chart structures including a plurality transmission regions with different brightness placed therein so that the plurality of transmission regions overlap planar view, and the plurality of transmission regions are constituted with a dotted region having transmissivity wherein light shielding dots are randomly placed.

Hereinafter, the gray gradation chart in the present disclosure will be described in detail.

FIG. 9A is a schematic planar view of each layer (gray gradation chart structure) of the gray gradation chart wherein the four gray gradation chart structures 21 from the first layer to the fourth layer are stacked, and FIG. 9B is an enlarged view of a dotted region wherein light shielding dots are randomly placed. The gray gradation chart structure 21 includes dotted region 22 having transmissivity wherein light shielding dots are randomly placed, and gray gradation chart structure light shielding portion 23 wherein the dots are not placed. By stacking the gray gradation chart structures 21, they compose a gray gradation chart including a plurality of transmission regions with different light transmittance.

Figure 10:
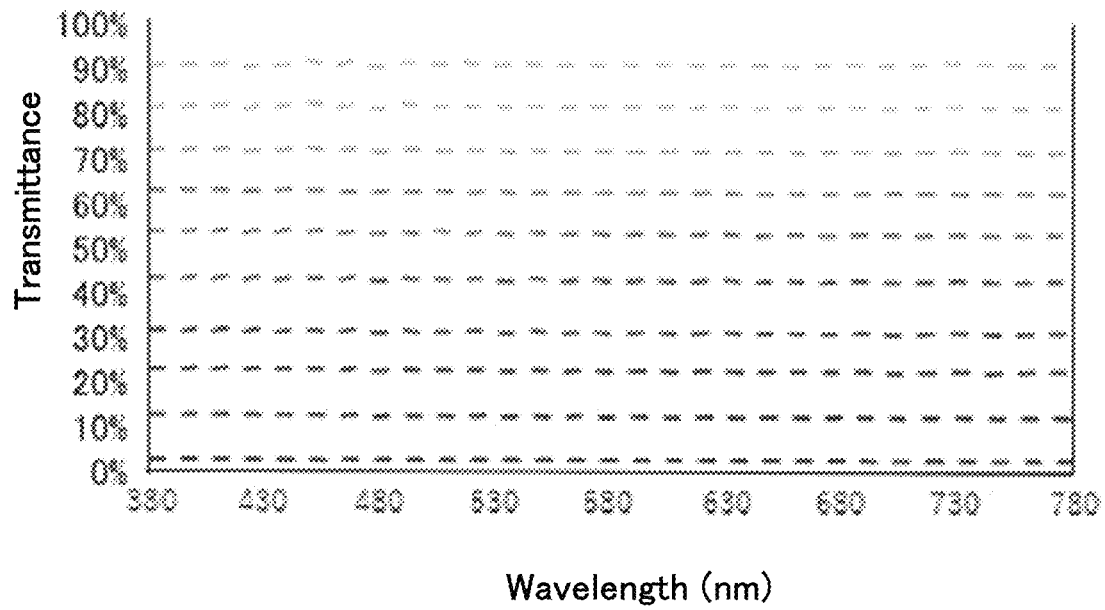
FIG. 10 is a graph illustrating transmittance for each wavelength shown by the gray gradation chart in the present disclosure.

The transmittance of each transmission region of the gray gradation chart in the present disclosure is shown in FIG. 10. As illustrated in FIG. 10, the transmittance of the gray gradation chart in the present disclosure is substantially constant for each wavelength. Therefore, when used in combination with the color chart member, that is, when used as a gray gradation chart member of the transmission type color gradation chart described above, the saturation and the luminosity may be adjusted simultaneously so that it is possible to adjust quickly and accurately. FIG. 9C is a schematic top view of the transmission type color gradation chart wherein the gray gradation chart in the present disclosure is stacked on the color chart member.

1. Gray Gradation Chart Structure

In the present disclosure, the gray gradation chart structure includes a dotted region having transmissivity wherein light shielding dots are randomly placed, and a gray gradation chart structure light shielding portion having a light shielding property. The gray gradation chart structure includes a plurality of dotted regions defined by the gray gradation chart structure light shielding portion, as illustrated in FIG. 9A.

Such a gray gradation chart structure is used as a gray gradation chart by stacking a plurality of layers of the gray gradation chart structures including the dotted regions placed in parallel. In this case, it is preferable that each gray gradation chart structure to be stacked has a different length in the direction perpendicular to the parallel direction of the dotted regions placed in parallel, and that the number the dotted regions included in each gray gradation chart structure is different.

By having the configuration described above, when used as a gray gradation chart, a plurality of stacked dotted regions constitutes the transmission region. Therefore, the transmittance of the respective transmission regions may be changed by changing the number of the stacked dotted regions and the transmittance of the respective dotted regions. Particularly, since it is extremely difficult to adjust the transmittance at low brightness with a single layer, such method adjusting the transmittance by stacking the dotted regions, is extremely useful.

As a method for stacking the gray gradation chart structures, it is preferable to stack so that the length in the direction perpendicular to the parallel direction of the dotted regions, that is, the number of dotted regions included in the gray gradation chart structure changes in sequential order. Examples of the method for staging in this case may include, as illustrated in FIG. 9A for example a method wherein the gray gradation chart structures are stacked so that one end side in the longitudinal direction thereof are aligned.

In the example illustrated in FIG. 9A, the number of the stacked gray gradation chart structure is large on the right side of the drawing so that the transmittance of the transmission region of the gray gradation chart is low. Meanwhile, on the left side of the drawing, the number of the stacked gray gradation chart structures is small so that the transmittance in the transmission region of the gray gradation chart is high.

(1) Dotted Region

The dotted region in the present disclosure is a region having transmissivity wherein light shielding dots are randomly placed. Random is a condition wherein the arrangement has no periodicity as perfectly arrayed. Specifically, random digits may generated and arranged using a Mersenne-Twister or an error diffusion method.

Particularly, the randomization is desirably a random arrangement that is not repeated within dotted region or between the stacked dotted regions.

By randomly arranging the dots as described above, the occurrence of interference fringe may be suppressed when the gray gradation chart structures are stacked. FIG. 9B illustrates an enlarged view of the dotted region.

The transmittance of the dotted region may be adjusted by adjusting the density of the included dots. A plurality of dotted regions is preferably included per one gray gradation chart structure. In this instance, the plurality of dotted regions in one gray gradation chart structure may have the same dot density (the same transmittance) with each other, and the dot density may be different (the transmittance may be different).

The shape of the dot in planar view is not particularly limited, and is preferably a shape such as a substantially square shape, a substantially circular shape, a rectangular shape, and a circular shape.

The size of the dot is not particularly limited, and the size is preferably a size not resolved when photographed at 8K resolution. Specifically, with respect to the test chart effective surface of 230 mm×1.70 mm, at a position of 50 cm distance from the camera, the size is preferably a size not resolved when photographed at 8K resolution (the number of pixels, horizontal 7680×vertical 4320). Therefore, the size is preferably approximately 30 μm (230 mm/7680)×40 μm (170 mm/4320) or less. The lower limit is not particularly limited, and is preferably 2 μm or more wherein a wavelength change does not occur even in the near infrared wavelength.

The dotted region may be obtained by forming a random dot pattern on a support such as a substrate and a film having light transmissivity by, for example, a print method, and a lithography method (drawing method).

The shape in planar view of the dotted region is not particularly limited, and as illustrated in FIG. 9A for example, the dotted regions are preferably placed in a line, with the brightness changed in sequential order. Specifically, the dotted regions having a rectangular, ellipse, or oval shape in planar view are preferably placed in parallel. Also, as illustrated in FIG. 3, the dotted regions may be placed in a plurality of rows.

Each dotted region in the gray gradation chart structure cannot be accurately calibrated if the light irradiated to the adjacent do ted region is interfused. Therefore, in order to prevent the light from leaking to the adjacent dotted region, the distance from the adjacent dotted region ((d) in FIG. 9A) is preferably half or more of the width of the dotted region, and particularly preferably the same as the width of the dotted region or more.

The reason why such ranges are preferable, and definitions of the width of the dotted region, for example, are the same as those described in the section "A. Transmission type color gradation chart, 2. Gray gradation chart member, (1) Plurality of transmission regions, (a) Shape of plurality of transmission regions", and therefore descriptions thereof are omitted here. In the above explanation, the dotted region is described as the transmission reason.

(2) Gray Gradation Chart Structure Light Shielding Portion

In order to prevent the light from sneaking, the gray gradation chart structure in the present disclosure preferably includes a gray gradation chart structure light shielding portion, having a light shielding property, around the dotted region. Further, a light shielding region is preferably formed also on the end surface of the gray gradation chart structure.

Examples of the gray gradation chart structure light shielding portion may include those similar to ones described in "A. Transmission type color gradation chart, 2. Gray gradation chart member, (2) Gray gradation chart light shielding portion" described above.

2. Gray Gradation Chart

The gray gradation chart in the present disclosure is obtained by stacking the gray gradation chart structures so that the dotted regions of the plurality of gray gradation chart structures described above are overlapped in a planar view, and the transmittance of each transmission region may be adjusted according to the dot density of the dotted region in each gray gradation chart structure, the number the gray gradation chart structures to be stacked, or a method for stacking. Therefore, the luminosity of the transmitted light may be precisely adjusted, and it is possible to easily produce a gray gradation chart including a plurality of transmission regions with different brightness, that is, with different light transmittance.

Figure 11:
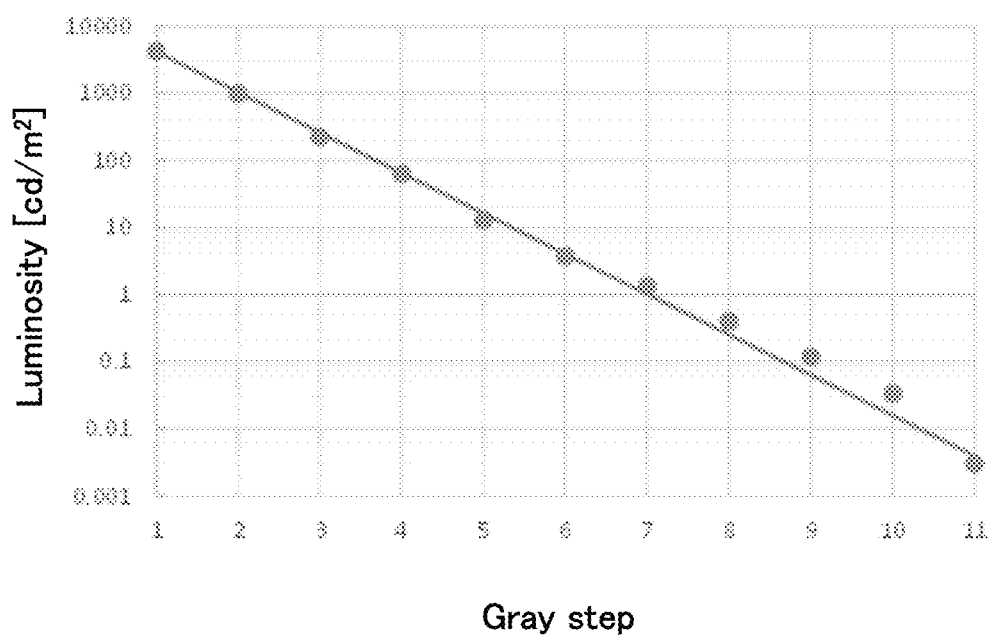
FIG. 11 is a graph illustrating luminosity of the transmitted light of each transmission region of the gray gradation chart in the present disclosure.

The horizontal axis of FIG. 11 shows the number of each transmission region (gray step) in the gray gradation chart in the present disclosure, and the vertical axis shows the luminosity of the transmitted light exhibited by each transmission region. As illustrated in FIG. 11, in the gray gradation chart in the present disclosure, the luminosity of 0.005 cd/m$^2$ may be accurately realized.

Also, for example, the minimum brightness difference between a plurality transmission regions in the low brightness region of 0.005 cd/m$^2$ may be formed.

3. Others

In addition to the configurations described above, the gray gradation chart in the present disclosure may include, for example, a cover glass, a gray gradation chart structure holding frame, and a transparent protective plate with a light shielding portion.

4. Application

The gray gradation chart in the present disclosure may be used, for example, in an imaging device, and Super Hi-Vision (HDR for 4K and 8K) compliant camera wherein fine brightness adjustment is required.

It may also be used as "A. Transmission type color gradation chart, 2. Gray gradation chart member" described above.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST

1: color chart member
2: gray gradation chart member
3: color bar
4: transmission region
10: transmission type color gradation chart
21: gray gradation chart structure
22: dotted region
100: transmission type color gradation chart device
101, 102: protective substrate
103, 104, 105: light shielding cover

The invention claimed is:

1. A transmission type color gradation chart comprising:
a color chart member including at least one color bar wherein transmitted light exhibits chromatic color; and
a gray gradation chart member wherein transmitted light exhibits achromatic color, and includes a plurality of transmission regions with different brightness,
wherein the color chart member and the gray gradation chart member are stacked so that there is a duplicative transmission region wherein the color bar and the plurality of transmission regions overlap in planar view.

2. The transmission type color gradation chart according to claim 1, wherein a covered portion in the plurality of transmission regions is formed using a black colorant or a metal.

3. The transmission type color gradation chart according to claim 1, wherein the plurality of transmission regions is constituted with a dotted region having transmissivity wherein light shielding dots are randomly placed.

4. The transmission type color gradation chart according to claim 1, wherein a spacer is placed between the color chart member and the gray gradation chart member, and the spacer includes an opening portion in the duplicative transmission region.

5. The transmission type color gradation chart according to claim 1, wherein a field angle determination mark for determining a field angle of an imaging device to be calibrated by the transmission type color gradation chart, is formed on a main surface, different from a gray gradation chart member side main surface, of the color chart member.

6. The transmission type color gradation chart according to claim 1, wherein a distance between the adjacent transmission regions in the plurality of transmission regions is a half or more of the width of the transmission region.

7. A transmission type color gradation chart device comprising:
two protective substrates; and
the transmission type color gradation chart according to claim 1 sandwiched between the two protective substrates.

8. A gray gradation chart comprising stacked gray gradation chart structures including a plurality of transmission regions with different brightness placed therein so that the plurality of transmission regions overlap in planar view, and
the plurality of transmission regions is constituted with a dotted region having transmissivity wherein light shielding dots are randomly placed.

9. The gray gradation chart according to claim 8, wherein a distance between the adjacent dotted regions is a half or more of the width of the dotted region.

10. A method for color calibrating an imaging device, the method comprises:
- preparing a transmission type color gradation chart including a color chart member including at least one color bar wherein transmitted light exhibits chromatic color, and a gray gradation chart member wherein transmitted light exhibits achromatic color, and includes a plurality of transmission regions with different brightness, wherein the color chart member and the gray gradation chart member are stacked so that there is a duplicative transmission region wherein the color bar and the plurality of transmission regions overlap in planar view; a lighting equipment; and an imaging device;
- photographing an image of the transmission type color gradation chart, with the imaging device, from one surface side of the transmission type color gradation chart by irradiating light, using the lighting equipment as a light source, from another surface side of the transmission type color gradation chart; and
- color calibrating the imaging device based on the photographed image photographed with the imaging device.

11. The method for color calibrating an imaging device according to claim 10, wherein, in the transmission type color gradation chart, the color chart member is placed on the imaging device side.

* * * * *